United States Patent
Dall'Occo et al.

(10) Patent No.: US 11,021,555 B2
(45) Date of Patent: Jun. 1, 2021

(54) CATALYST FOR THE POLYMERIZATION OF OLEFINS

(71) Applicant: BASELL POLIOLEFINE ITALIA S.R.L., Milan (IT)

(72) Inventors: Tiziano Dall'Occo, Ferrara (IT); Simona Guidotti, Ferrara (IT); Dario Liguori, Ferrara (IT); Giampiero Morini, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 163 days.

(21) Appl. No.: 16/317,676

(22) PCT Filed: Jul. 7, 2017

(86) PCT No.: PCT/EP2017/067130
§ 371 (c)(1),
(2) Date: Jan. 14, 2019

(87) PCT Pub. No.: WO2018/011086
PCT Pub. Date: Jan. 18, 2018

(65) Prior Publication Data
US 2019/0284316 A1    Sep. 19, 2019

(30) Foreign Application Priority Data
Jul. 15, 2016 (EP) .................... 16179662

(51) Int. Cl.
*C08F 210/16* (2006.01)
(52) U.S. Cl.
CPC ........ *C08F 210/16* (2013.01); *C08F 2410/01* (2013.01); *C08F 2410/04* (2013.01)
(58) Field of Classification Search
CPC .......... C08F 210/00–16; C08F 10/00
See application file for complete search history.

(56) References Cited

U.S. PATENT DOCUMENTS

| | | |
|---|---|---|
| 4,427,573 A | 1/1984 | Miles et al. |
| 4,613,655 A | 9/1986 | Long et al. |
| 6,806,221 B2 | 10/2004 | Wagner et al. |
| 2013/0244863 A1 | 9/2013 | Xu |
| 2013/0296510 A1* | 11/2013 | Guo ............ C08F 10/06 526/124.2 |

FOREIGN PATENT DOCUMENTS

| | | | |
|---|---|---|---|
| CN | 1726230 A | 1/2006 | |
| CN | 103052656 A | 4/2013 | |
| CN | 103052662 A | 4/2013 | |
| CN | 104903362 A | 9/2015 | |
| EP | 0083456 A1 | 7/1983 | |
| EP | 2787014 A1 | 10/2014 | |
| JP | 2010155949 A | 7/2010 | |
| WO | WO-2014048964 A1 * | 4/2014 | ............. C08F 10/06 |
| WO | 2016050662 A1 | 4/2016 | |
| WO | WO-2016050662 A1 * | 4/2016 | ............ C08F 4/6493 |

OTHER PUBLICATIONS

International Search Report and Written Opinion dated Sep. 1, 2017 (Sep. 1, 2017) for Corresponding PCT/EP2017/067130.

* cited by examiner

*Primary Examiner* — Catherine S Branch

(57) ABSTRACT

A catalyst component for the polymerization of olefins, comprising Ti, Mg, halogen, an electron donor (ID) selected from the group consisting of aliphatic cyclic ethers and alkyl esters of aliphatic monocarboxylic acids and a compound of a metal selected from the group consisting of Zn and Cu, wherein the catalyst component is devoid of Zn—C or Cu—C bonds and the Mg/Ti molar ratio ranges from 4.0 to 50.0.

13 Claims, No Drawings

CATALYST FOR THE POLYMERIZATION OF OLEFINS

This application is the U.S. National Phase of PCT International Application PCT/EP2017/067130, filed Jul. 7, 2017, claiming benefit of priority to European Patent Application No. 16179662.8, filed Jul. 15, 2016, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a catalyst component for the polymerization of olefins.

BACKGROUND OF THE INVENTION

Linear low-density polyethylene (LLDPE) includes ethylene/α-olefin copolymers containing an amount of α-olefin deriving units such that products with a density in the range 0.88-0.925 are produced. These copolymers find application in the field of wrapping and packaging of goods. LLDPE is commercially produced with liquid phase processes (solution or slurry) or via gas-phase processes. Both technologies may involve the use of Ziegler-Natta $MgCl_2$-supported catalysts that are formed by the reaction of a solid catalyst component, in which a titanium compound is supported on a magnesium halide, with an activator such as an alkylaluminium compound.

For some applications, the homogeneous distribution of the comonomer (α-olefin) in and among the polymer chains is useful. Having a comonomer randomly or alternatively distributed along the polymer chain and having the polymer fractions with a similar average content of comonomer can provide ethylene copolymers with desirable properties. In some instances, these polymers having randomly or alternatively distributed comonomers combine a density lower than that of HDPE and a low content of polymer fractions soluble in hydrocarbon solvents like hexane or xylene.

Catalysts used in LLDPE preparation should show ability to homogeneously distribute the comonomer and produce an ethylene copolymer having reduced polymer density and low content of hydrocarbon soluble matter.

Single-site homogeneous catalysts have these features when used in solution processes but lose effectiveness in terms of activity and polymer morphology when fixed on supports for use in different polymerization techniques such as gas-phase polymerization.

Ziegler-Natta heterogeneous catalysts are less effective in producing ethylene copolymers wherein the comonomer is homogeneously distributed and the amount of hydrocarbon soluble matter is low. However, Ziegler-Natta heterogeneous catalysts are suited for any polymerization technology. In some cases, the use of an amount of internal electron donor, such as tetrahydrofuran (THF), in the solid catalyst component preparation improves the homogeneity of comonomer distribution.

SUMMARY OF THE INVENTION

The present disclosure provides a catalyst component for the polymerization of olefins, made from or containing Ti, Mg, halogen, an electron donor (ID) selected from the group consisting of aliphatic cyclic ethers and alkyl esters of aliphatic monocarboxylic acids and a compound of a metal selected from the group consisting of Zn and Cu, wherein the catalyst component is devoid of Zn—C or Cu—C bonds, the Mg/Ti molar ratio ranges from 4.0 to 50.0, the amount of Cu or Zn metals with respect to Mg ranges from 1.0 to 40.0% mol, and the Mg/ID molar ratio ranges between 1 and 5.

DETAILED DESCRIPTION OF THE INVENTION

In some embodiments, the amount of compound of metal selected from the group consisting of Cu and Zn is such that the amount of Cu or Zn metals with respect to Mg ranges from 2.0 to 30.0% mol, alternatively from 2 to 25%, alternatively from 3.0 to 15.0% mol.

In some embodiments, the Zn compound is selected from the group consisting of Zn halides, Zn carbonate, Zn acetate, Zn nitrate, Zn oxide, Zn sulfate, and Zn Sulfide. In some embodiments, the Zn halides are selected from the group consisting of Zn dichloride and Zn bromide. In some embodiments, the Zn compound is Zn dichloride.

In some embodiments, the Cu compound is selected from the group consisting of Cu halides, Cu carbonate, Cu acetate, Cu nitrate, Cu oxide, Cu sulfate and Cu sulfide. In some embodiments, the Cu compound includes Cu with the valence +2. In some embodiments, the Cu halides are selected from the group consisting of Cu dichloride and Cu dibromide. In some embodiments, the Cu compound is $CuCl_2$.

In some embodiments, the ID compound is selected from the group consisting of cyclic ethers having 3-5 carbon atoms. In some embodiments, the ID compound is selected from the group consisting of tetrahydrofuran, dioxane, and methyltetrahydrofuran. In some embodiments, the ID compound is tetrahydrofuran.

In some embodiments, the esters are selected from the group consisting of the alkyl esters of $C_1$-$C_{20}$ aliphatic carboxylic acids. In some embodiments, the esters are selected from the group consisting of $C_1$-$C_8$ alkyl esters of aliphatic mono carboxylic acids. In some embodiments, the $C_1$-$C_8$ alkyl esters of aliphatic mono carboxylic acids are selected from the group consisting of ethylacetate, methyl formiate, ethylformiate, methylacetate, propylacetate, i-propylacetate, n-butylacetate, and i-butylacetate.

In some embodiments, the Mg/ID molar ratio ranges between 1 and 2.5, alternatively ranging from 1.0 and 2.0. In some embodiments, the Mg/Ti molar ratio ranges from 7 to 40, alternatively from 10.0 to 25.0.

In some embodiments, the Mg atoms are in form a magnesium dihalide and the Ti atoms are in form of titanium tetrahalides or the compounds of formula $TiX_n(OR^1)_{4-n}$, where $0 \leq n \leq 3$, X is halogen, alternatively chlorine, and $R^1$ is $C_1$-$C_{10}$ hydrocarbon group. In some embodiments, the Ti compound is titanium tetrachloride.

In some embodiments, the catalyst components are prepared according to a method including the following steps:
(a) contacting a $MgX_2(R"OH)m$ adduct in which R" groups are $C_1$-$C_{20}$ hydrocarbon groups and X is halogen, with a liquid medium made from or containing a Ti compound having at least a Ti—Cl bond, in an amount such that the Ti/Mg molar ratio is greater than 3, thereby forming a solid intermediate,
(b) contacting the electron donor compound (ID) with the solid intermediate product coming from step (a) under conditions to have on the resulting solid a Mg/ID molar ratio lower than 5; the process having the compound of metal made from or containing Zn or Cu being added in step (a) or (b).

In some embodiments, the starting $MgX_2(R''OH)m$ adducts have R" groups as $C_1$-$C_{10}$ alkyl groups, X as chlorine and m from 0.5 to 3, alternatively from 0.5 to 2. In some embodiments, the adducts are obtained by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. In some embodiments, the methods for the preparation of these spherical adducts are as described in U.S. Pat. Nos. 4,469,648, 4,399,054, and Patent Cooperation Treaty Publication No. WO98/44009. In some embodiments, the method for the spherulization is the spray cooling described in U.S. Pat. No. 5,100,849 or 4,829,034.

In some embodiments, the Mg-based adducts are $MgCl_2$.(EtOH)m adducts in which m is from 0.15 to 1.5 and have a particle size ranging from 10 to 100 μm obtained by subjecting the adducts with a higher alcohol content to a thermal dealcoholation process carried out in nitrogen flow at temperatures between 50 and 150° C. until the alcohol content is reduced to the above value. In some embodiments, the process is as described in European Patent Publication No. EP 395083.

In some embodiments, the dealcoholation is carried out chemically by contacting the adduct with compounds capable of reacting with the alcohol groups.

In some embodiments, the dealcoholated adducts are characterized by a porosity (measured by mercury method) due to pores with radius up to 1 μm ranging from 0.15 to 2.5 $cm^3/g$ alternatively from 0.25 to 1.5 $cm^3/g$.

In some embodiments, the Cu and/or Zn compounds are added to step (a) in different ways. In some embodiments, the Cu and/or Zn compound is dissolved or dispersed in the liquid medium made from or containing the titanium compound having at least a Ti—Cl bond.

In some embodiments, the liquid medium made from or containing the Ti compound is a mixture of the Ti compound in another liquid diluent. In some embodiments, the diluents are hydrocarbons, optionally chlorinated, that are liquid at room temperature. In some embodiments, the liquid medium consists of the liquid titanium compound. In some embodiments, the titanium compound is $TiCl_4$.

In some embodiments, the Zn or Cu compounds is included directly into the $MgX_2(R''OH)_m$ adducts as described in Patent Cooperation Treaty Publication Nos. WO2014/161905 and WO 2014/048964.

In some embodiments, the titanium compound is chosen among $TiX_n(OR')_{4-n}$ compound and mixtures thereof. In some embodiments, the titanium compound is titanium tetrachloride. In some embodiments, the reaction with the Ti compound is carried out by suspending the adduct in $TiCl_4$; subsequently the mixture is heated up to temperatures ranging from 80-130° C. and kept at this temperature for 0.5-2 hours. In some embodiments, the suspending step occurs below room temperature. In some embodiments, the treatment with the titanium compound is carried out one or more times. In some embodiments, the treatment with the titanium compound is carried out two times. At the end of the process the intermediate solid is recovered by separation of the suspension. In some embodiments, the separation method includes settling and removing of the liquid, filtration, or centrifugation. In some embodiments, the intermediate solid is subjected to washings with solvents. In some embodiments, the washings are carried out with inert hydrocarbon liquids. In some embodiments, the washings are carried out with more polar solvents such as halogenated hydrocarbons. In some embodiments, the more polar solvents have a higher dielectric constant.

The intermediate solid is, in step (b) brought into contact with the ID compound under conditions such as to fix on the solid an amount of donor such that the Mg/ID molar ratio is within the range previously disclosed. In some embodiments, the reaction is carried out under conditions such that the ID is added to the reaction mixture alone or in a mixture with other compounds.

The contact is optionally carried out in a liquid medium such as a liquid hydrocarbon. The temperature at which the contact takes place can vary depending on the nature of the reagents. In some embodiments, the temperature in the range from –10° to 150° C., alternatively from 0° to 120° C. Temperatures causing the decomposition or degradation of any specific reagents should be avoided even if the temperatures fall within the above ranges. In some embodiments, the time of the treatment varies in dependence on other conditions such as nature of the reagents, temperature, and concentration. In some embodiments, this contact step lasts from 10 minutes to 10 hours, alternatively from 0.5 to 5 hours. In some embodiments, in order to further increase the final donor content, the contact step is repeated one or more times.

In some embodiments, when the Cu and/or Zn compounds are added in step (b) of the process, those compounds are dissolved in the ID compound. In some embodiments, when the metal compound is poorly soluble in the ID, the solubility is increased by using solubility coadjuvants or conditions (temperature, pressure) modification. In some embodiments, the compound is converted into a more soluble compound. In some embodiments, $CuCl_2$ is converted into $Li_2CuCl_4$, which is much more soluble than $CuCl_2$ in aliphatic cyclic ethers like THF, to be dissolved in the ID.

At the end of this step the solid is recovered by separation of the suspension. In some embodiments, the separation method includes settling and removing of the liquid, filtration, or centrifugation. In some embodiments, the solid is subjected to washings with solvents. In some embodiments, the washings are carried out with inert hydrocarbon liquids. In some embodiments, the washings are carried out with more polar solvents such as halogenated or oxygenated hydrocarbons. In some embodiments, the more polar solvents have a higher dielectric constant.

In some embodiments, the ID is selected from aliphatic cyclic ethers and after step (b), a further step (c) is carried out including recovering the solid catalyst component of step (b) and subjecting the solid catalyst component coming from step (b) to a thermal treatment carried out at a temperature from 70 to 150° C.

In the step (c) of the method, the solid product recovered from step (b) is subject to a thermal treatment carried out at temperatures ranging from 70 to 150° C., alternatively from 80° C. to 130° C., alternatively from 85 to 100° C.

In some embodiments, the thermal treatment involves the solid coming from step (b) being suspended in an inert diluent like a hydrocarbon and then subjected to the heating while maintaining the system under stirring.

In some embodiments, the solid is heated in a dry state by inserting the solid in a device having jacketed heated walls. In some embodiments, stirring is provided by mechanical stirrers placed within the device. In some embodiments, stirring is caused by using rotating devices.

In some embodiments, the solid coming from (b) is heated by subjecting the solid to a flow of hot inert gas such as nitrogen. In some embodiments, the solid is maintained under fluidization conditions.

The heating time is not fixed but may vary depending also on the other conditions such as the maximum temperature reached. In some embodiments, the heating time ranges from 0.1 to 10 hours, alternatively from 0.5 to 6 hours. In some embodiments, higher temperatures allow the heating time to be shorter. In some embodiments, lower temperatures require longer reaction times.

In some embodiments, the solid catalyst components containing tetrahydrofuran as internal donor and subject to step (c) are characterized by an X-ray diffraction spectrum, in which, in the range of 2θ diffraction angles between 5.0° and 20.0°, at least three main diffraction peaks are present at diffraction angles 2θ of 7.2±0.2°, and 11.5±0.2° and 14.5±0.2°, with the peak at 2θ of 7.2±0.2° being the most intense peak and the peak at 11.5±0.2° having an intensity less than 0.9 times the intensity of the most intense peak.

In some embodiments, in the X-ray diffraction spectrum, the intensity of the peak at 11.5° has an intensity less than 0.8 times the intensity of the diffraction peak at 2θ diffraction angles of 7.2±0.2°.

In some embodiments, the process as described each of the step (b)-(c) is carried out immediately after the previous step, without the need of isolating the solid product coming from that previous step. In some embodiments, the solid product coming from a step can be isolated and washed before being subject to the subsequent step.

In some embodiments, the ID is selected from alkyl esters of aliphatic monocarboxylic acids and the process includes carrying out a prepolymerization step (a2) before carrying out step (b).

In some embodiments, the pre-polymerization is carried out with the olefins $CH_2=CHR$, where R is H or a $C_1$-$C_{10}$ hydrocarbon group. In some embodiments, ethylene or propylene or mixtures thereof are pre-polymerized with one or more α-olefins, wherein the mixtures contains up to 20% in moles of α-olefin, forming amounts of polymer from about 0.1 g up to about 1000 g per gram of solid intermediate, alternatively from about 0.5 to about 500 g per gram of solid intermediate, alternatively from 0.5 to 50 g per gram of solid intermediate, alternatively from 0.5 to 5 g per gram of solid intermediate. In some embodiments, the pre-polymerization step is carried out at temperatures from 0 to 80° C., alternatively from 5 to 70° C., in the liquid or gas phase. In some embodiments, the pre-polymerization of the intermediate with ethylene or propylene produces an amount of polymer ranging from 0.5 to 20 g per gram of intermediate. In some embodiments, the pre-polymerization is carried out with the use of a cocatalyst such as organoaluminum compounds. In some embodiments, the solid intermediate is prepolymerized with propylene and the prepolymerization is carried out in the presence of one or more external donors. In some embodiments, the external donors are selected from the group consisting of silicon compounds of formula $R_a^5R_b^6Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. In some embodiments, the silicon compounds have a is 0, c is 3, $R^6$ is a branched alkyl or cycloalkyl group, optionally containing heteroatoms, and $R^7$ is methyl. In some embodiments, the silicon compounds are selected from the group consisting of cyclohexyltrimethoxysilane, t-butyltrimethoxysilane and thexyltrimethoxysilane.

In some embodiments, the particles of solid catalyst components have substantially spherical morphology and average diameter between 5 μm and 150 μm, alternatively from 10 μm to 100 μm. As used herein, "particles having substantially spherical morphology" indicates that the particles have the ratio between the greater axis and the smaller axis equal to, or lower than 1.5, alternatively lower than 1.3.

In some embodiments, the solid catalyst components show a surface area (by B.E.T. method) between 10 and 200 $m^2/g$, alternatively between 20 and 80 $m^2/g$, and a total porosity (by B.E.T. method) higher than 0.15 $cm^3/g$, alternatively between 0.2 and 0.6 $cm^3/g$. In some embodiments, the porosity (Hg method) due to pores with radius up to 1 μm ranges from 0.25 to 1 $cm^3/g$, alternatively from 0.35 to 0.8 $cm^3/g$.

In some embodiments, the catalyst component is used as prepared. In some embodiments, the catalyst component is used after a preliminary pre-polymerization step carried out under the same conditions previously described.

In some embodiments, the $C_3$-$C_{10}$ α-olefins include propylene, 1-butene, 1-hexene, and 1-octene, the like, and mixtures thereof. In some embodiments, the α-olefin is 1-butene, 1-hexene, or a mixture thereof. The amount of α-olefin used depends on the density of LLDPE. In some embodiments, the α-olefin is used in amount within the range of 5 to 10 wt % of ethylene. In some embodiments, density of LLDPE is within the range of 0.88 to 0.940 $g/cm^3$, alternatively within the range of 0.910 to 0.940 $g/cm^3$, alternatively within the range of 0.915 to 0.935 $g/cm^3$. In some embodiments, the LLDPE has a melt index MI"E" within the range of 0.1 to 10 dg/min, alternatively within the range of 0.5 to 8 dg/min.

In some embodiments, the LLDPE resin is a copolymer of ethylene and 1-butene having 1-butene content within the range of 5 to 10 wt %. In some embodiments, the ethylene-1-butene copolymer has a density from 0.912 to 0.925 $g/cm^3$, alternatively from 0.915 to 0.920 $g/cm^3$. In some embodiments, the ethylene-1-butene copolymer has an MI"E" within the range of 0.5 to 15 dg/min, alternatively from 1 to 10 dg/min In some embodiments, the catalyst components are used for production in gas-phase of the LLDPE.

In some embodiments, the LLDPE is used in many applications, including films, pipes, containers, adhesives, wire and cable, and molding parts.

In some embodiments, the solid catalyst components are converted into catalysts for the polymerization of olefins by reacting the solid catalyst components with organoaluminum compounds.

In some embodiments, a catalyst for the polymerization of olefins $CH_2=CHR$, in which R is hydrogen or a hydrocarbyl radical with 1-12 carbon atoms is provided, made from or containing the product of the reaction between:

(A) a solid catalyst component,
(B) an alkylaluminum compound and, optionally,
(C) an external electron donor compound (ED).

In some embodiments, the alkyl-Al compound is trialkyl aluminum compound. In some embodiments, the trialkyl aluminum compound is selected from the group consisting of trimethylaluminum (TMA), triethylaluminum (TEAL), triisobutylaluminum (TIBA), tri-n-butylaluminum, tri-n-hexylaluminum (THA), and tri-n-octylaluminum. In some embodiments, the alkyl-Al compound is an alkylaluminum halide. In some embodiments, the alkylaluminum halide is an alkylaluminum chloride. In some embodiments, the alkylaluminum chloride is selected from the group consisting of diethylaluminum chloride (DEAC), diisobutylaluminum chloride, Al-sesquichloride and dimethylaluminum chloride (DMAC). In some embodiments, the alkyl-Al compounds are mixtures of trialkylaluminums with alkylaluminum halides. In some embodiments, the mixtures are between TEAL, THA and DEAC. In some embodiments, the alkyl-Al compound is TIBA, alone or in mixture.

In some embodiments, the external electron donor compound (ED) is the same as or different from the internal electron donor (ID) used in the solid catalyst component. In some embodiments, the external electron donor is selected from the group consisting of ethers, esters, amines, ketones, nitriles, silanes and mixtures of the above. In some embodiments, the external electron donor is selected from the $C_2$-$C_{20}$ aliphatic ethers. In some embodiments, the external electron donor is cyclic ethers. In some embodiments, the cyclic ethers are 3-5 carbon atoms cyclic ethers such as tetrahydrofuran, dioxane.

In some embodiments, in addition to the aluminum alkyl cocatalyst (B) and the external electron donor (ED) (C), a halogenated compound (D) is used as activity enhancer. In some embodiments, the halogenated compound is a mono or dihalogenated hydrocarbon. In some embodiments, the halogenated compound is selected from monohalogenated hydrocarbons wherein the halogen is linked to a secondary carbon atom. In some embodiments, the halogen is selected from the group consisting of chloride and bromide.

In some embodiments, the halogenated compound (D) is selected from the group consisting of propylchloride, i-propylchloride, butylchloride, s-butylchloride, t-butylchloride 2-chlorobutane, cyclopentylchloride, cyclohexylchloride, 1,2-dichloroethane, 1,6-dichlorohexane, propylbromide, and i-propylbromide, butylbromide, s-butylbromide, t-butylbromide, butylbromide i-pentylbromide, and t-pentylbromide. In some embodiments, the halogenated compound (D) is selected from the group consisting of i-propylchloride, 2-chlorobutane, cyclopentylchloride, cyclohexylchloride, 1,4 dichlorobutane and 2-bromopropane.

In some embodiments, the halogenated compound (D) is selected from the group consisting of halogenated alcohols, esters or ethers. In some embodiments, the halogenated compound (D) is selected from the group consisting of 2,2,2,-trichloroethanol, ethyl trichloroacetate, butyl perchlorocrotonate, 2-chloro propionate and 2-chloro-tetrahydrofuran.

In some embodiments, the activity enhancer is used in amounts such as to have the (B)/(D) molar ratio of higher than 3, alternatively in the range 5-50, alternatively in the range 10-40.

In some embodiments, the components (A)-(D) are fed separately into the reactor. In some embodiments, the components are pre-contacted, optionally in the presence of small amounts of olefins, for a period of time ranging from 1 minute to 10 hours, alternatively in the range from 2 to 7 hours. In some embodiments, the pre-contact is carried out in a liquid diluent at a temperature ranging from 0 to 90° C., alternatively in the range of 20 to 70° C.

In some embodiments, one or more alkyl aluminum compound or mixtures thereof are used in the precontact. In some embodiments, more than one alkylauminum compound is used in the precontact and are added together or added sequentially to the precontact tank. In some embodiments, the precontact is carried out and the whole amount of aluminum alkyl compounds is not added at that stage. In some embodiments, a portion is added in the pre-contact while the remaining aliquot is fed to the polymerization reactor. In some embodiments, more than one aluminum alkyl compound is used, one or more of the aluminum alkyl compounds are used in the precontact, and the remaining aluminum alkyl compounds are fed to the reactor.

In some embodiments, a pre-contacting process is carried out by first contacting the catalyst component with a first aluminum alkyl compound being a first aluminum trialkyl, then a second aluminum alkyl compound is added to the mixture, and finally a third aluminum alkyl compound being a second aluminum trialkyl is added to the pre-contact mixture. In some embodiments, the first aluminum trialkyl is tri-n-hexyl aluminum (THA). In some embodiments, the second aluminum alkyl compound is diethylaluminum chloride. In some embodiments, the second aluminum trialkyl is triethylaluminum. In some embodiments, the second aluminum trialkyl is added to the polymerization reactor.

In some embodiments, the total amount of aluminum alkyl compounds is within broad ranges, alternatively ranges from 2 to 10 mols per mole of internal donor in the solid catalyst component.

In some embodiments, the catalyst component is used in gas-phase polymerization. In some embodiments, the catalyst component is used in a fluidized or mechanically stirred bed. In some embodiments the catalyst components are used in gas-phase reactors working under fast fluidization conditions. In some embodiments, the gas-phase processes are as described in Patent Cooperation Treaty Publication No. WO 92/21706, U.S. Pat. No. 5,733,987 or Patent Cooperation Treaty Publication No. WO 93/03078.

In some embodiments, the polymerization temperature ranges from 50 and 120° C., alternatively between 60 and 100° C. In some embodiments, the operating pressure is between 0.5 and 10 MPa, alternatively between 2.0 and 6 MPa.

The following examples are given in order to further describe the present disclosure in a non-limiting manner.

Characterization

The properties are determined according to the following methods:

Determination of Mg, $Ti_{(TOT)}$, Zn and Cu

The determination of Mg, $Ti_{(TOT)}$, Zn and Cu content in the solid catalyst component was carried out via inductively coupled plasma emission spectroscopy on "I.C.P Spectrometer ARL Accuris". The sample was prepared by analytically weighing, in a Fluxy "platinum crucible", 0.1÷0.3 grams of catalyst and 2 grams of lithium metaborate/tetraborate 1/1 mixture. After addition of some drops of KI solution, the crucible was inserted in a special apparatus "Claisse Fluxy" for the complete burning. The residue was collected with a 5% v/v HNO3 solution and then analyzed via ICP at the following wavelengths: magnesium, 279.08 nm; titanium, 368.52 nm; Zinc, 213.86 nm; copper, 327.40 nm.

Determination of Cl

The determination of Cl content in the solid catalyst component was carried out by potentiometric titration with silver nitrate. In a 250 mL beaker, charged 5 mL of a sodium hydroxide solution 10% wt./vol. in water and 0.1÷0.3 grams of catalyst were. After 20 min stirring at room temperature, 40 mL of a 3.6 M nitric acid solution in water were added and stirring continued for additional 10 min. After dilution with 100 mL of demineralized water, the titration started with a 0.1 N $AgNO_3$ solution in water. At the point of equivalence, the amount of titrant used was calculated and the chlorine amount was quantified.

Determination of Internal Donor Content

The content of internal donor in the solid catalyst component was determined by 1H NMR analysis, dissolving the catalyst (about 40 mg) in acetone d6 (about 0.6 ml) in the presence of an internal reference and transferred in to a 5 mm (O.D.) NMR tube. The amount of donor present was based on the weight of the catalyst compound.

Average Particle Size of the Adduct and Catalysts

Determined by a method based on the principle of the optical diffraction of monochromatic laser light with the "Malvern Instr. 2600" apparatus. The average size was given as P50.

Porosity and surface area with nitrogen: were determined according to the B.E.T. method (apparatus used SORPTOMATIC 1900 by Carlo Erba).

Porosity and Surface Area with Mercury:

The measure was carried out using a "Porosimeter 2000 series" by Carlo Erba.

The porosity was determined by absorption of mercury under pressure. For this determination a calibrated dilatometer (diameter 3 mm) CD3 (Carlo Erba) connected to a reservoir of mercury and to a high-vacuum pump (1.10-2 mbar) was used. A weighed amount of sample was placed in the dilatometer. The apparatus was then placed under high vacuum (<0.1 mm Hg) and maintained under these conditions for 20 minutes. The dilatometer was then connected to the mercury reservoir and the mercury was allowed to flow slowly into the dilatometer until the mercury reached a height of 10 cm. The valve that connected the dilatometer to the vacuum pump was closed and then the mercury pressure was gradually increased with nitrogen up to 140 kg/cm$^2$. Under the effect of the pressure, the mercury enters the pores and the level went down according to the porosity of the material.

Total porosity (cm$^3$/g), porosity due to pores up to 1 μm, the pore distribution curve, and the average pore size were directly calculated from the integral pore distribution curve which was function of the volume reduction of the mercury and applied pressure values (these data are provided and elaborated by the porosimeter associated computer which is equipped with a "MILESTONE 200/2.04" program by C. Erba.

X-Ray Determination

X-ray diffraction spectra were collected by using Bruker D8 Advance powder diffractometer. The spectra have been recorded by using the CuKα1(λ=1,5405 Å) in the range of 2θ from 5° to 60° with incremental step of 0.2° and collection time of 12 seconds. During the acquisition of the X-ray pattern, the samples were enclosed into tailor made and air tight sample holder able to maintain the powders into N$_2$ atmosphere.

Determination of Melt Index (MI E, MIF)

Melt index was measured at 190° C. according to ASTM D-1238 condition "E" (load of 2.16 Kg).

Determination of Fraction Soluble in Xylene

The solubility in xylene at 25° C. was determined according to the following method: about 2.5 g of polymer and 250 mL of o-xylene were placed in a round-bottomed flask provided with cooler and a reflux condenser and kept under nitrogen. The mixture obtained was heated to 135° C. and kept under stirring for about 60 minutes. The final solution was allowed to cool to 25° C. under continuous stirring and then filtered. The filtrate was then evaporated in a nitrogen flow at 140° C. to reach a constant weight. The content of the xylene-soluble fraction was expressed as a percentage of the original 2.5 grams.

Determination of Comonomer Content

1-Butene was determined via $^{13}$C NMR analysis.

13C NMR spectra were acquired on a Bruker AV-600 spectrometer equipped with cryo-probe, operating at 150.91 MHz in the Fourier transform mode at 120° C.

The peak of the Sδδ carbon (nomenclature according to C. J. Carman, R. A. Harrington and C. E. Wilkes, Macromolecules, 10, 3, 536 (1977)) was used as internal reference at 29.90 ppm. The samples were dissolved in 1,1,2,2-tetrachloroethane-d2 at 120° C. with an 8% wt/v concentration. Each spectrum was acquired with a 90° pulse, 15 seconds of delay between pulses and CPD to remove 1H-13C coupling. About 512 transients were stored in 32K data points using a spectral window of 9000 Hz.

Assignments of the spectra were made according to J. C. Randal, Macromol. Chem Phys., C29, 201 (1989).

Triad distribution and composition were made starting from relations between peaks and triads described by Kakugo et al. modified to consider overlaps of signals in the spectra.

Triads
BBB=100 Tββ/S
BBE=100 Tβδ/S
EBE=100 2B2 (EBE)/S
BEB=100 Sββ/S
BEE=100 Sαδ/S
EEE=100 (0.25 Sγδ+0.5 Sδδ)/S
Molar Composition
B=BBB+BBE+EBE
E=EEE+BEE+BEB Determination of Effective Density Effective density: ASTM-D 1505-10 but referred to MI"E" 1 g/10' as corrected by the following equation:
density (MIE=1)=density(measured)−0.0024 ln(MI E)

General Procedure for the Preparation of Spherical MgCl$_2$.(EtOH)m Adducts.

An initial amount of microspheroidal MgCl$_2$.2.8C$_2$H$_5$OH was prepared according to the method described in Example 2 of Patent Cooperation Treaty Publication No. WO98/44009 but on a larger scale. The stirring conditions during the preparation were adjusted to obtain the selected average particle size. The resulting microspheroidal MgCl$_2$-EtOH adduct was subjected to a thermal treatment under nitrogen stream over a temperature range of 50-150° C. Using this method, solid support materials containing 28.5% wt of EtOH, having average particle size of 23 μm were obtained.

General Procedure for the Gas-Phase Copolymerization of Ethylene and Butene

A gas phase copolymerization of ethylene and butene was carried out in a small scale fluidized bed reactor, equipped with automated pressure and temperature control.

Firstly, the solid catalyst, about 0.090 g, was precontacted for 15 minutes in hexane slurry at room temperature with trihexyl aluminum (THA), at THA/THF=0.23 molar. Subsequently, a diethyl aluminum chloride (DEAC) solution in hexane was added to the catalyst/THA slurry, such to have DEAC/THF=0.44 molar. The mixture was contacted for another 15 minutes at room temperature. Then, a triethyl aluminum (TEA) solution in hexane was added to the slurry, to meet a molar ratio Al_total/THF=4.1-4.2. Directly after the addition of the TEA, the precontact-slurry was discharged into the gas phase reactor that was prepared at the selected conditions.

The gas phase reactor was controlled at a temperature of 86° C., and a pressure of 21 barg. The gas phase was composed of 25 mol % ethylene, 5 mol % hydrogen, butene ranging from 10 and 14% mol and propane to reach the final pressure. After the introduction of the precontacted catalyst into the reactor, an ethylene/butene mixture (7-10 wt % of butene) was continuously fed to the reactor to maintain constant pressure and composition in the reactor during the polymerization test. After 90 minutes, the monomer feed was stopped, and the polymer bed formed during the polymerization run was discharged into a degassing vessel. The polymer was recovered and additionally degassed under vacuum. Polymer characteristics are reported in Table 2.

EXAMPLES

Comparative Example 1

Preparation of the Solid Component.

Into a 750 mL four-necked round flask, purged with nitrogen, 500 mL of $TiCl_4$ were introduced at 0° C. Then, at the same temperature, 20 grams of spherical adduct were added under stirring. The temperature was raised to 130° C. and maintained at that temperature for 1 hours. Then, the stirring was discontinued, the solid product was allowed to settle and the supernatant liquid was siphoned off. A new amount of fresh $TiCl_4$ was added to the flask, to reach the initial liquid volume. The temperature was maintained at 110° C. for 0.5 hour. Again, the solid was allowed to settle, and the liquid was siphoned off.

The solid was then washed three times with anhydrous hexane (250 mL at each washing) at 60° C. and twice at 40° C.

500 mL of anhydrous heptane were added to the solid component and heated under stirring to 50° C. At the same temperature, under stirring, 10.5 ml of THF were added dropwise. The temperature was then raised to 95° C. and the mixture was continuously stirred for 2 hours. Then, the temperature was decreased to 80° C., the stirring was discontinued, the solid product was allowed to settle and the supernatant liquid was siphoned off.

The solid was washed twice with anhydrous hexane (2×250 mL) at 40° C., recovered, dried under vacuum and analyzed.

The compositional results are reported in Table 1 while the catalyst performances in gas phase copolymerization of ethylene and butene are shown in Table 2.

Example 2-6

The procedure reported in Comparative Example 1 was repeated with the difference that in addition to the spherical adduct, solid $CuCl_2$, in the amount reported in Table 1, was charged into the reactor containing $TiCl_4$.

Examples 7-11

The procedure reported in Comparative Example 1 was repeated with the difference that in addition to the spherical adduct, solid $ZnCl_2$, in the amount reported in Table 1, was charged into the reactor containing $TiCl_4$.

TABLE 1

| Example n | % Mt feed v.s. Mg | % Mt on the catalyst v.s. Mg | Mg wt % | Ti wt % | THF wt % | Mg/THF Mol ratio |
|---|---|---|---|---|---|---|
| Comp. 1 | | | 14.8 | 1.8 | 32.7 | 1.35 |
| 2 | 2.5 | 1.8 | 14.5 | 1.8 | 32.2 | 1.34 |
| 3 | 5.1 | 3.6 | 14.6 | 1.8 | 30.6 | 1.41 |
| 4 | 10.2 | 7.8 | 13.9 | 1.8 | 29.3 | 1.41 |
| 5 | 15.0 | 9.1 | 13.9 | 1.6 | 28.2 | 1.47 |
| 6 | 21.7 | 9.7 | 13.8 | 1.4 | 28.4 | 1.45 |
| 7 | 2.5 | | — | — | 33.9 | |
| 8 | 4.8 | 3.2 | 14.2 | 1.9 | 30.8 | 1.37 |
| 9 | 9.9 | 8.0 | 13.5 | 1.7 | 29.9 | 1.34 |

TABLE 1-continued

| Example n | % Mt feed v.s. Mg | % Mt on the catalyst v.s. Mg | Mg wt % | Ti wt % | THF wt % | Mg/THF Mol ratio |
|---|---|---|---|---|---|---|
| 10 | 14.7 | 12.8 | 12.6 | 1.7 | 32.7 | 1.14 |
| 11 | 20.0 | 21.1 | 11.7 | 1.6 | 30.1 | 1.15 |

TABLE 2

| Cat from Ex. n | Mileage Kg/g | $C_4^-$ % wt | Xylene soluble % wt | Density g/cm³ | MI E g/10' |
|---|---|---|---|---|---|
| Comp 1 | 6.1 | 7.8 | 6.1 | 0.9218 | 0.90 |
| | 9.9 | 8.7 | 8.6 | 0.9178 | 1.08 |
| | 9.6 | 9.9 | 11.8 | 0.9148 | 1.22 |
| 2 | 6.9 | 7.9 | — | — | — |
| 3 | 8.6 | 9.8 | 12.0 | 0.9135 | 1.52 |
| 4 | 6.1 | 8.2 | 5.5 | 0.9181 | 0.95 |
| 5 | 7.1 | 8.6 | 7.5 | — | — |
| 6 | 5.4 | 7.8 | 4.9 | 0.9199 | 0.85 |
| 7 | 7.9 | 7.3 | — | — | — |
| 8 | 6.1 | 7.9 | — | — | — |
| 9 | 7.2 | 9.9 | 11.8 | 0.9139 | 1.39 |
| 10 | 5.6 | 7.4 | — | — | — |
| 11 | 5.4 | 9.3 | 8.5 | 0.9155 | 1.07 |

What is claimed is:

1. A catalyst component for the polymerization of olefins, comprising:
   Ti,
   Mg,
   halogen,
   an electron donor (ID) selected from the group consisting of aliphatic cyclic ethers and alkyl esters of aliphatic monocarboxylic acids and
   a compound of a metal,
   wherein the Mg/Ti molar ratio ranges from 4.0 to 50.0, the amount of metal with respect to Mg ranges from 1.0 to 40 mol. % and the Mg/ID molar ratio ranges between 1 and 5, and
   wherein the compound of a metal comprises Cu and the Cu compound is selected from the group consisting of Cu halides, Cu carbonate, Cu acetate, Cu nitrate, Cu oxide, Cu sulfate and Cu sulfide.

2. The catalyst component according to claim 1, wherein the amount of compound of metal with respect to Mg ranges from 2.0 to 30.0% mol.

3. The catalyst component according to claim 2, wherein the amount of compound of metal with respect to Mg ranges from 2.0 to 25% mol.

4. The catalyst component according to claim 1, wherein the ID is selected from the group consisting of cyclic ethers having 3-5 carbon atoms.

5. The catalyst component according to claim 1, wherein the ID is selected from the group consisting of $C_1$-$C_8$ alkyl esters of aliphatic mono carboxylic acids.

6. The catalyst component according to claim 1, wherein the Mg/ID molar ratio ranges between 1 and 2.5.

7. The catalyst component according to claim 1, wherein the Mg/Ti molar ratio ranges from 7.0 to 40.0.

8. A process for the preparation of the solid catalyst components according to claim 1 comprising the following steps:
   (a) contacting a $MgX_2(R"OH)m$ adduct in which R" groups are $C_1$-$C_{20}$ hydrocarbon groups, m is from 0.5 to 3, and X is halogen, with a liquid medium comprising a Ti compound having at least a Ti—Cl bond, in an amount such that the Ti/Mg molar ratio is greater than 3, thereby forming a solid intermediate; and (b) contacting the electron donor compound (ID) with the solid intermediate product coming from step (a) under conditions to have on the resulting solid a Mg/ID molar ratio lower than 5, wherein the compound of metal is added in step (a) or (b).

9. The process according to claim 8, wherein the metal is dissolved or dispersed in the liquid medium comprising the titanium compound having at least a Ti—Cl bond.

10. The process according to claim 8, wherein the ID is selected from aliphatic cyclic ethers.

11. The process according to claim 10 further comprising:

(c) recovering the solid product from step (b) and subjecting the solid product to a thermal treatment carried out at temperatures ranging from 70 to 150° C.

12. A catalyst system for the polymerization of olefins comprising:

the product of the reaction between:

(A) a solid catalyst component according to claim 1,
(B) an alkylaluminum compound and, optionally,
(C) an external electron donor compound (ED).

13. A process for the preparation of olefin polymer carried out by polymerizing olefins in the presence of a catalyst system according to claim 12.

* * * * *

UNITED STATES PATENT AND TRADEMARK OFFICE
CERTIFICATE OF CORRECTION

| | |
|---|---|
| PATENT NO. | : 11,021,555 B2 |
| APPLICATION NO. | : 16/317676 |
| DATED | : June 1, 2021 |
| INVENTOR(S) | : Dall'Occo et al. |

It is certified that error appears in the above-identified patent and that said Letters Patent is hereby corrected as shown below:

On the Title Page

Item [30], Line 1, delete "16179662" and insert -- 16679662.8 --, therefor

In the Specification

In Column 3, Line 52, delete "$TiX_n(OR')_{4-n}$" and insert -- $TiX_n(OR^1)_{4-n}$ --, therefor Signed and Sealed this
Twenty-fourth Day of January, 2023

Katherine Kelly Vidal
*Director of the United States Patent and Trademark Office*